US012675529B2

(12) United States Patent
Yim

(10) Patent No.: US 12,675,529 B2
(45) Date of Patent: Jul. 7, 2026

(54) RENDERING SUGGESTION FOR SEARCHING ENTITY WITHIN APPLICATION IN RESPONSE TO DETERMINING THE ENTITY IS ASSOCIATED WITH THE APPLICATION

(71) Applicant: GOOGLE LLC, Mountain View, CA (US)

(72) Inventor: Keun Soo Yim, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 310 days.

(21) Appl. No.: 18/206,465

(22) Filed: Jun. 6, 2023

(65) Prior Publication Data

US 2024/0411813 A1 Dec. 12, 2024

(51) Int. Cl.
*G06F 16/248* (2019.01)
*G06F 16/9032* (2019.01)
(Continued)

(52) U.S. Cl.
CPC ...... *G06F 16/90332* (2019.01); *G06F 40/247* (2020.01); *G06F 40/295* (2020.01); *G06F 40/30* (2020.01)

(58) Field of Classification Search
CPC .. G06F 3/04883; G06F 9/453; G06F 16/9535; G06F 16/951; G06F 16/338;
(Continued)

(56) References Cited

U.S. PATENT DOCUMENTS 9,342,626 B1 * 5/2016 Das .................... G06F 16/9535
11,704,136 B1 7/2023 Matthew
(Continued)

FOREIGN PATENT DOCUMENTS

KR 20160103875 9/2016

OTHER PUBLICATIONS

European Patent Office; International Search Report and Written Opinion issued in Application No. PCT/US2023/036885; 12 pages; dated Feb. 7, 2024.
(Continued)

*Primary Examiner* — Olujimi A Adesanya
(74) *Attorney, Agent, or Firm* — Gray Ice Higdon

(57) ABSTRACT

Implementations include determining that an entity is associated with an application, determining fulfillment information for fulfilling a search of the entity within the application, and, in response to determining that the entity is associated with the application, storing, at a computing device, an association between the entity and the fulfillment information for fulfilling the search of the entity within the application. Some of those implementations further include, subsequent to the storing, receiving, via the computing device, incomplete user input that indicates the entity but not the application, and in response to receiving the incomplete user input, causing a suggestion to be rendered via the computing device in a selectable format based on the stored association between the entity and the fulfillment information. The suggestion in the selectable format, when selected, executes the fulfillment information to fulfill the search of the entity within the application.

22 Claims, 7 Drawing Sheets

500

RECEIVE, FROM A CLIENT DEVICE, USER INPUT IDENTIFYING AN ENTITY BUT NOT AN APPLICATION TO ACCESS THE ENTITY 501

PROCESS THE USER INPUT IDENTIFYING THE ENTITY BUT NOT THE APPLICATION TO ACCESS THE ENTITY, USING A PROBABILISTIC MODEL AS INPUT, TO GENERATE AN OUTPUT THAT, FOR EACH OF ONE OR MORE APPLICATIONS INSTALLED AT THE CLIENT DEVICE, INDICATES A LIKELIHOOD THAT THE ENTITY IS PRESENT IN A CORRESPONDING APPLICATION OF THE ONE OR MORE APPLICATIONS 503

DETERMINE, BASED ON THE OUTPUT OF THE PROBABILISTIC MODEL, A PARTICULAR APPLICATION TO ACCESS THE ENTITY, THE PARTICULAR APPLICATION BEING FROM THE ONE OR MORE APPLICATIONS INSTALLED AT THE CLIENT DEVICE 505

DETERMINE FULFILLMENT INFORMATION TO FULFILL A SEARCH OF THE ENTITY WITHIN THE PARTICULAR APPLICATION 507

GENERATE AND CAUSE A SUGGESTION HAVING THE FULFILLMENT INFORMATION TO BE RENDERED IN A SELECTABLE FORMAT FOR SELECTION BY A USER OF THE CLIENT DEVICE, WHERE THE SUGGESTION IS RENDERED RESPONSIVE TO THE USER INPUT 509

IN RESPONSE TO RECEIVING ADDITIONAL USER INPUT THAT SELECTS THE SUGGESTION HAVING THE FULFILLMENT INFORMATION, EXECUTE THE FULFILLMENT INFORMATION TO PERFORM THE SEARCH OF THE ENTITY WITHIN THE PARTICULAR APPLICATION 511

(51) Int. Cl.
  *G06F 40/247*     (2020.01)
  *G06F 40/295*     (2020.01)
  *G06F 40/30*      (2020.01)

(58) Field of Classification Search
  CPC .. G06F 16/9538; G06F 21/31; G06F 16/2455;
    G06F 16/248; G06F 16/90335; G06F
    16/2228; G06F 16/337; G06F 9/451;
    G06F 16/90344; G06F 16/95; G06F
    16/903; G06F 3/048; G06F 16/9038
  See application file for complete search history.

(56)          References Cited

U.S. PATENT DOCUMENTS

| | | | |
|---|---|---|---|
| 12,124,881 B2 | 10/2024 | Talavera | |
| 12,182,149 B1 | 12/2024 | Krishna | |
| 12,353,427 B2 * | 7/2025 | Yim | G06F 16/24578 |
| 2008/0294630 A1 * | 11/2008 | Yan | G06Q 30/0256 |
| | | | 707/999.005 |
| 2011/0010244 A1 * | 1/2011 | Hatridge | H04L 67/025 |
| | | | 717/176 |
| 2011/0208763 A1 * | 8/2011 | McSherry | G06F 16/901 |
| | | | 707/757 |
| 2012/0284256 A1 * | 11/2012 | Mahajan | G06F 16/9537 |
| | | | 707/E17.014 |
| 2014/0053088 A1 * | 2/2014 | Civelli | G06F 16/90335 |
| | | | 715/760 |
| 2014/0172840 A1 * | 6/2014 | Kumar | G06F 16/248 |
| | | | 707/723 |
| 2014/0214898 A1 * | 7/2014 | Shapira | G06F 16/24578 |
| | | | 707/769 |

| | | | |
|---|---|---|---|
| 2015/0193447 A1 * | 7/2015 | Voinea | G06F 16/3322 |
| | | | 707/767 |
| 2016/0098566 A1 * | 4/2016 | Patil | G06Q 30/0256 |
| | | | 726/26 |
| 2017/0024389 A1 * | 1/2017 | Liu | G06F 16/9538 |
| 2017/0032257 A1 | 2/2017 | Sharifi et al. | |
| 2017/0098012 A1 * | 4/2017 | Zhu | G06F 16/24578 |
| 2017/0132294 A1 * | 5/2017 | Cooper | G06F 16/248 |
| 2017/0311053 A1 | 10/2017 | Ganjam et al. | |
| 2018/0113753 A1 | 4/2018 | Franklin | |
| 2018/0341865 A1 * | 11/2018 | Lu | G06F 8/61 |
| 2019/0050930 A1 * | 2/2019 | Andrew | G06Q 30/0201 |
| 2020/0034357 A1 | 1/2020 | Panuganty et al. | |
| 2021/0118008 A1 * | 4/2021 | Glover | G06Q 30/0247 |
| 2021/0192134 A1 * | 6/2021 | Yue | G06F 3/04895 |
| 2021/0256366 A1 * | 8/2021 | Zhao | G06N 3/045 |
| 2021/0328949 A1 | 10/2021 | Yim | |
| 2022/0147775 A1 | 5/2022 | Yim | |
| 2022/0200883 A1 * | 6/2022 | Zhang | H04L 43/0894 |
| 2022/0238107 A1 * | 7/2022 | Kim | G06F 16/332 |
| 2023/0005019 A1 | 1/2023 | Huang | |
| 2023/0359241 A1 | 11/2023 | Faaborg | |
| 2024/0167834 A1 | 5/2024 | Sharifi | |
| 2024/0220324 A1 | 7/2024 | Talavera | |
| 2024/0411770 A1 * | 12/2024 | Yim | G06F 16/90332 |

OTHER PUBLICATIONS

Aliannejadi et al., "Target Apps Selection: Towards a Unified Search Framework for Mobile Devices" arXiv:1805.02211v3 [cs.IR] 10 pages, dated Jul. 13, 2018.
Jacucci, G. et al.; Entity Recommendation for Everyday Digital Tasks; 41 pages; dated 2021.

\* cited by examiner

2

200

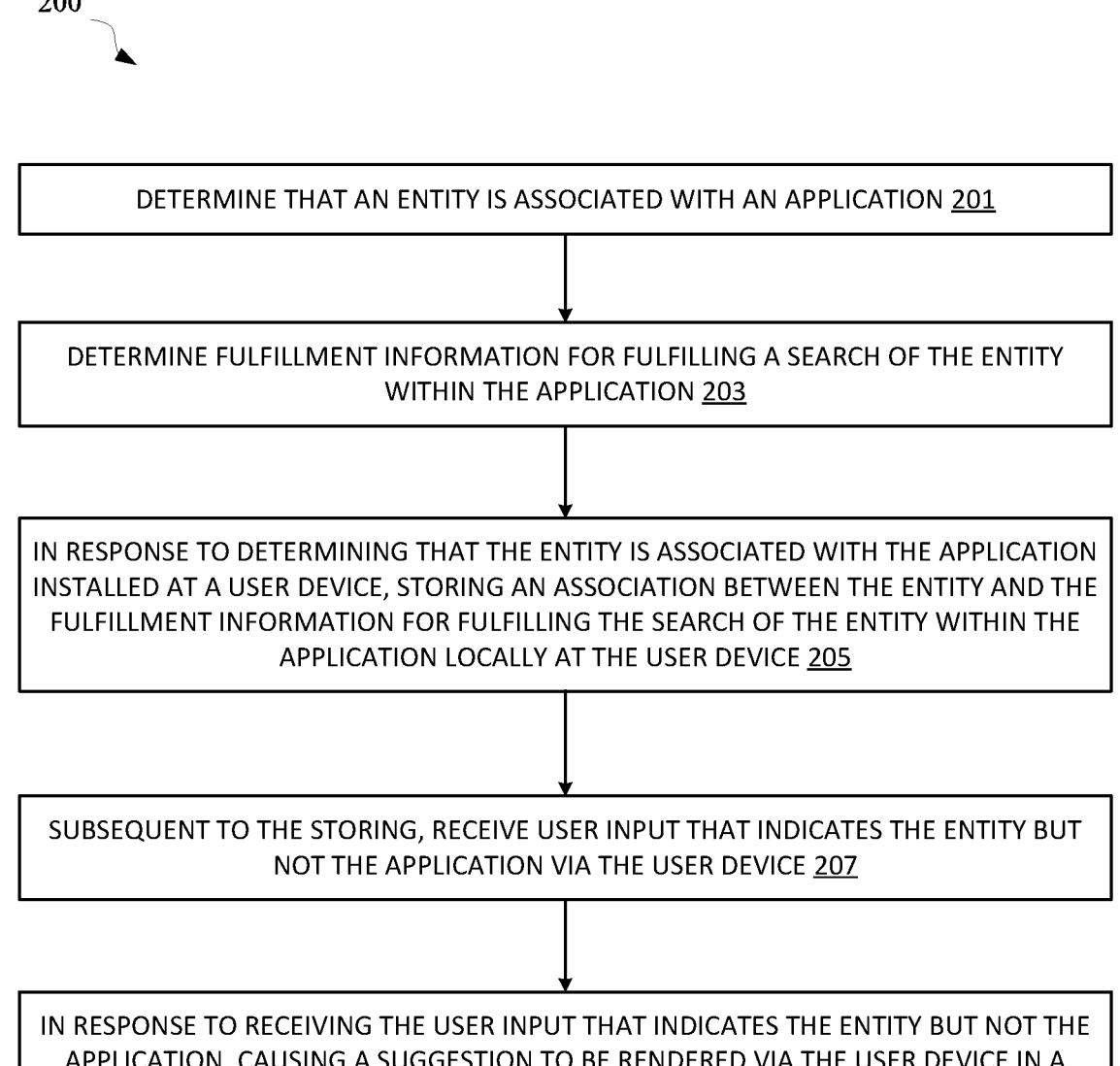

DETERMINE THAT AN ENTITY IS ASSOCIATED WITH AN APPLICATION 201

DETERMINE FULFILLMENT INFORMATION FOR FULFILLING A SEARCH OF THE ENTITY WITHIN THE APPLICATION 203

IN RESPONSE TO DETERMINING THAT THE ENTITY IS ASSOCIATED WITH THE APPLICATION INSTALLED AT A USER DEVICE, STORING AN ASSOCIATION BETWEEN THE ENTITY AND THE FULFILLMENT INFORMATION FOR FULFILLING THE SEARCH OF THE ENTITY WITHIN THE APPLICATION LOCALLY AT THE USER DEVICE 205

SUBSEQUENT TO THE STORING, RECEIVE USER INPUT THAT INDICATES THE ENTITY BUT NOT THE APPLICATION VIA THE USER DEVICE 207

IN RESPONSE TO RECEIVING THE USER INPUT THAT INDICATES THE ENTITY BUT NOT THE APPLICATION, CAUSING A SUGGESTION TO BE RENDERED VIA THE USER DEVICE IN A SELECTABLE FORMAT, BASED ON THE STORED ASSOCIATION BETWEEN THE ENTITY AND THE FULFILLMENT INFORMATION 209

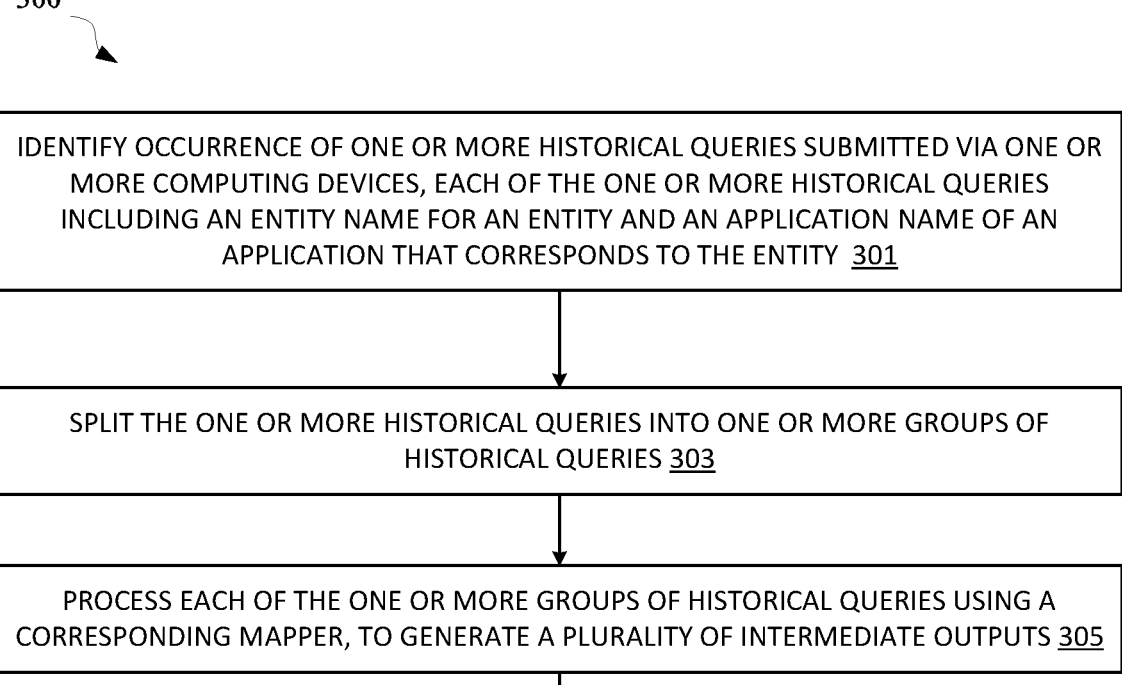

IDENTIFY OCCURRENCE OF ONE OR MORE HISTORICAL QUERIES SUBMITTED VIA ONE OR MORE COMPUTING DEVICES, EACH OF THE ONE OR MORE HISTORICAL QUERIES INCLUDING AN ENTITY NAME FOR AN ENTITY AND AN APPLICATION NAME OF AN APPLICATION THAT CORRESPONDS TO THE ENTITY 301

SPLIT THE ONE OR MORE HISTORICAL QUERIES INTO ONE OR MORE GROUPS OF HISTORICAL QUERIES 303

PROCESS EACH OF THE ONE OR MORE GROUPS OF HISTORICAL QUERIES USING A CORRESPONDING MAPPER, TO GENERATE A PLURALITY OF INTERMEDIATE OUTPUTS 305

PROCESS THE PLURALITY OF INTERMEDIATE OUTPUTS USING ONE OR MORE REDUCERS, TO GENERATE A FINAL OUTPUT, THE FINAL OUTPUT INDICATING ONE OR MORE PUBLIC ENTITIES OR ONE OR MORE PRIVATE ENTITIES FOR EACH APPLICATION PRESENT IN THE ONE OR MORE HISTORICAL QUERIES 307

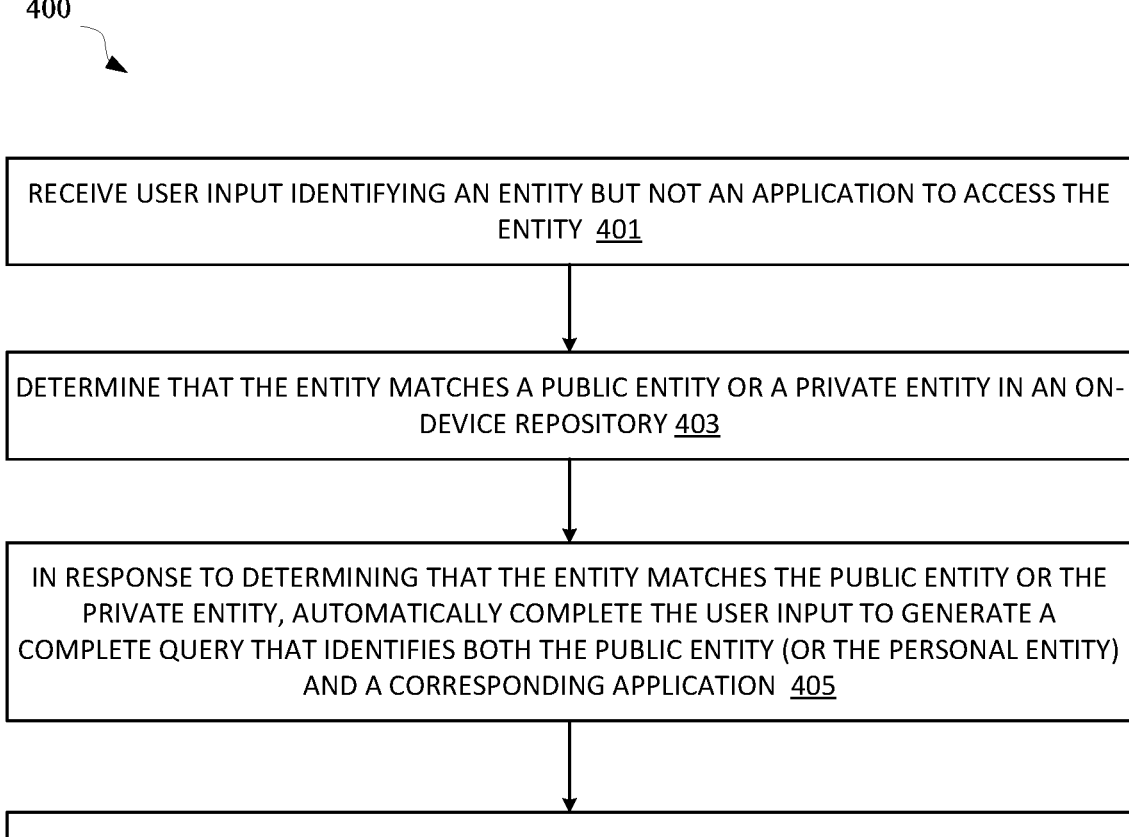

RECEIVE USER INPUT IDENTIFYING AN ENTITY BUT NOT AN APPLICATION TO ACCESS THE ENTITY <u>401</u>

DETERMINE THAT THE ENTITY MATCHES A PUBLIC ENTITY OR A PRIVATE ENTITY IN AN ON-DEVICE REPOSITORY <u>403</u>

IN RESPONSE TO DETERMINING THAT THE ENTITY MATCHES THE PUBLIC ENTITY OR THE PRIVATE ENTITY, AUTOMATICALLY COMPLETE THE USER INPUT TO GENERATE A COMPLETE QUERY THAT IDENTIFIES BOTH THE PUBLIC ENTITY (OR THE PERSONAL ENTITY) AND A CORRESPONDING APPLICATION  <u>405</u>

CAUSING THE COMPLETE QUERY TO BE RENDERED FOR SELECTION BY A USER<u>407</u>

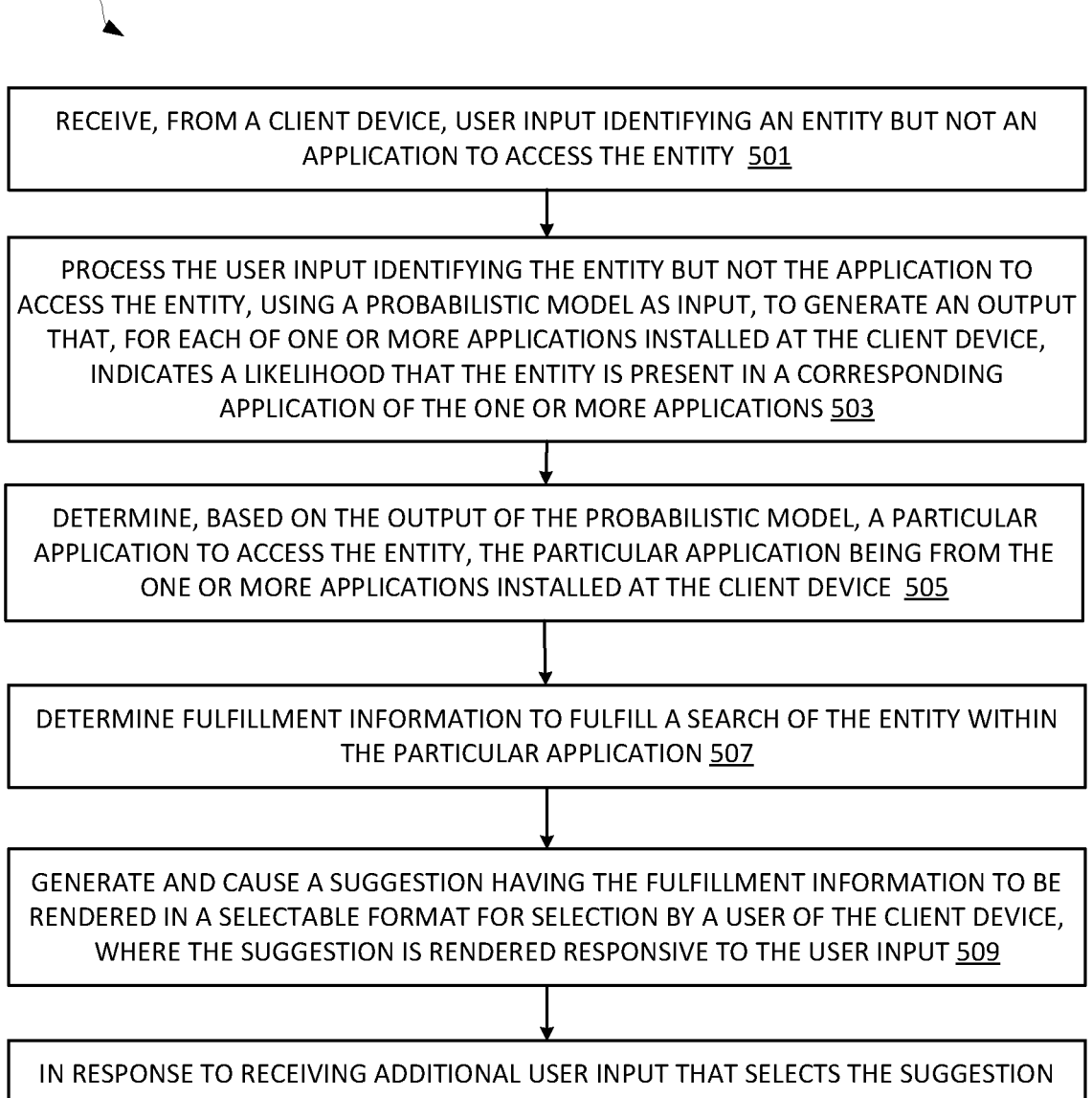

RECEIVE, FROM A CLIENT DEVICE, USER INPUT IDENTIFYING AN ENTITY BUT NOT AN APPLICATION TO ACCESS THE ENTITY  501

PROCESS THE USER INPUT IDENTIFYING THE ENTITY BUT NOT THE APPLICATION TO ACCESS THE ENTITY, USING A PROBABILISTIC MODEL AS INPUT, TO GENERATE AN OUTPUT THAT, FOR EACH OF ONE OR MORE APPLICATIONS INSTALLED AT THE CLIENT DEVICE, INDICATES A LIKELIHOOD THAT THE ENTITY IS PRESENT IN A CORRESPONDING APPLICATION OF THE ONE OR MORE APPLICATIONS 503

DETERMINE, BASED ON THE OUTPUT OF THE PROBABILISTIC MODEL, A PARTICULAR APPLICATION TO ACCESS THE ENTITY, THE PARTICULAR APPLICATION BEING FROM THE ONE OR MORE APPLICATIONS INSTALLED AT THE CLIENT DEVICE  505

DETERMINE FULFILLMENT INFORMATION TO FULFILL A SEARCH OF THE ENTITY WITHIN THE PARTICULAR APPLICATION 507

GENERATE AND CAUSE A SUGGESTION HAVING THE FULFILLMENT INFORMATION TO BE RENDERED IN A SELECTABLE FORMAT FOR SELECTION BY A USER OF THE CLIENT DEVICE, WHERE THE SUGGESTION IS RENDERED RESPONSIVE TO THE USER INPUT 509

IN RESPONSE TO RECEIVING ADDITIONAL USER INPUT THAT SELECTS THE SUGGESTION HAVING THE FULFILLMENT INFORMATION, EXECUTE THE FULFILLMENT INFORMATION TO PERFORM THE SEARCH OF THE ENTITY WITHIN THE PARTICULAR APPLICATION 511

RENDERING SUGGESTION FOR SEARCHING ENTITY WITHIN APPLICATION IN RESPONSE TO DETERMINING THE ENTITY IS ASSOCIATED WITH THE APPLICATION

BACKGROUND

Users, when using a client device such as a smartphone, are often presented with a plurality of applications installed at, or otherwise accessible, via the client device. From the plurality of presented applications, users can choose to explicitly trigger an application (e.g., a music app or a digital wallet), to fulfill an application action (e.g., play music, make a payment) with respect to a desired entity (e.g., a song within the music app, a credit card in a digital wallet, etc.) that is accessible via the application.

This often means that, if a user wants to access the desired entity, the user has to accurately identify the application that enables access to the desired entity, for the particular application to be explicitly triggered to provide the user with access to the desired entity. For example, the user will need to identify and launch the application, then provide input(s) within the launched application to navigate to or search for the entity. In the case where the user is using an automated assistant or an on-device search engine (or other query recommendation system), the user will have to accurately identify the particular application in a spoken query for accessing the desired entity to an automated assistant, or in a typed query for accessing the desired entity via an on-device search engine.

If the user provides an incomplete or inadequate query that identifies the desired entity but no application that enables access to the desired entity, such as a spoken or typed query of "Assistant, credit card X please" to an automated assistant, the automated assistant (or on-device search engine) may not be responsive to such spoken query or typed query. As a result, no application is triggered to fulfill an application action (e.g., search within the app, display, etc.) with respect to the desired entity (e.g., "credit card X"). This will result in repeated attempts by the user in providing an appropriate query that can trigger an application which provides access to the desired entity. Such repeated attempts can lead to extensive consumption of computing and/or battery resources of the client device.

SUMMARY

Implementations disclosed herein relate to enabling an on-device system (e.g., a search engine, an automated assistant, an operating system, or other system) of a client device to identify an application to utilize in automatically completing a user query that specifies an entity but fails to specify any application for accessing the entity. For example, implementations can determine, based on historical queries, that a particular entity is associated with a particular application. Further, in response to such a determination, implementations can, in response to a query that specifies the particular entity but fails to specify any application, cause a suggestion to be rendered that, when selected, executes fulfillment information that causes a search of the entity to be performed within the application. For instance, it can be determined, based on processing of historical queries, that Entity A is associated with Application X and, in response to a partial query that specifies an alias of Entity A, but that fails to specify any application, a suggestion can be rendered that, when selected, causes Application X to be launched and transitioned to a state in which Entity A is searched for or otherwise surfaced within Application X. The suggestion can, for example, include text that specifies Application X, an icon that specifies Application X, and/or other indicia of Application X. In these and other manners, a single selection of the suggestion can cause Entity A to be searched for within Application X—obviating the need for multiple inputs to search for Entity A within Application X. Further, through utilization of historical queries in determining that Entity A is associated with Application X, it can be ensured that Entity A is accessible within Application X and an association of Entity A with application X can be determined without requiring a developer of Application X to specify such an association.

An entity described herein can be a public entity or a personal entity. A client device described herein can include a plurality of installed applications. In various implementations, the on-device system described herein can train a probabilistic model and use the trained probabilistic model to generate a plurality of probabilities each indicating a likelihood of the entity being present in, or otherwise accessible via, a respective application out of the plurality of applications. Based on the plurality of probabilities, one or more suggestions can be generated and rendered to the user, responsive to a user query that specifies the entity. The one or more suggestions can be selectable and can each include (e.g., be embedded with) fulfillment information for triggering a corresponding application (out of the plurality of applications) to perform an application action (e.g., search, display, etc.) with respect to the entity. In this way, in cases where the user cannot remember a specific application to access the entity (or forget to include the specific application in a query towards the query recommendation system, etc.), the query recommendation system can still process the entity and provide responsive suggestion(s) for triggering an application that provides access to the entity. As a result, the user may not need to make repeated attempts in providing a complete query that includes an accurate application name, which results in reduced consumption of computing and battery resources of the client device.

Various implementations herein relate to determining that an entity (e.g., credit card X) is associated with an application (e.g., digital wallet Y). Determining that the entity is associated with the application can be based on identifying occurrences of one or more historical queries (e.g., thousands of, tens of thousands of historical queries) that are submitted via one or more computing devices. Each of the one or more historical queries can include an entity name for a respective entity and an application name for a respective application providing access to the respective entity. As a non-limiting example, the one or more historical queries can include a first historical query of "search Credit Card X on digital wallet Y", where the first historical query is generated based on a first user submitting, via a search field of an application (i.e., the digital wallet Y) accessed by the first user using a first client device, an entity name of "Credit Card X". As another non-limiting example, the one or more historical queries can include a second historical query of "play song A on music app B", where the second historical query is audibly received by an automated assistant from a second user (the same as or different from the first user). In this latter example, "song A" is an entity that the second user desires to access via a corresponding application of "music app B". The second historical query can be received via a second client device that is the same as, or different from the first client device.

In various implementations, the entity name for the respective entity can be a name (official, unofficial, etc.) of the respective entity, or an identifier of the respective entity. In various implementations, the application name for the respective entity can be an application nickname (e.g., E-Wallet for "digital wallet"), an application name synonym (e.g., DW for "digital wallet"), or an application type name (e.g., wallet for "digital wallet"). It's noted that the entity name or application name is not limited to descriptions herein.

In various implementations, the one or more historical queries can be collected and stored in a historical query collection file, which can be split into, or be processed to form, a plurality of query files (may also be referred to as "query logs") For example, the historical query collection file can include a massive amount of historical queries collected from different users and from different client devices. In this example, the historical query collection file can be divided (e.g., randomly) into a plurality of query files each having one or more of the historical queries. In some implementations, a plurality of historical queries can be collected and split to generate the plurality of query files directly (i.e., without forming the historical query collection file). The plurality of query files can be processed in parallel each using a mapper processing module (maybe simply referred to as a "mapper" that executes a mapping function mapping queries to entities), to generate a plurality of intermediate outputs. Each of the plurality of intermediate outputs can be in a form of key-value pairs (e.g., application-entity pairs, where each application can be a key, and entities can be values to be respectively associated with different keys). The key-value pairs, for instance, can be in a form of "<entity name> <application name>", "<application name> <entity name>", or any other applicable key-pair format).

As a non-limiting example, a first mapper can process a first query file that includes a first historical query of "search X1-on-Y1" (collected from a first user via a first client device, where X1 is an entity name of a first entity and Y1 is an application name of a first application), a second historical query of "search X2-on-Y1" (collected from a second user via a second client device, where X2 is an entity name of a second entity), and a third historical query of "search X1-on-Y2" (collected from a third user via a third client device, where Y2 is an application name of a second application different from the first application). In this example, the first mapper can generate an output (may be referred to as "first intermediate output") indicating three key-value pairs, e.g., <Entity X1> <Application Y1>; <Entity X2> <Application Y1>; <Entity X1> <Application Y2>.

The plurality of intermediate outputs (e.g., the aforementioned three key-value pairs combined with key-value pairs respectively determined by mappers that are in addition to the first mapper) can be shuffled to combine values associated with the same key (e.g., combine "entities" for the same "application", or combine "applications" for the same "entity"), for processing by one or more reducer processing modules ("reducer"). For example, the one or more reducers can receive different subsets of key-value pairs where each subset is associated with the same key, to generate a final output, from which one or more public entities and/or one or more personal entities for each application are determined. Here, a "public entity" means an entity present in over a threshold number of historical queries mentioning a same application that are issued by over a threshold number of users.

For example, given a total number of M historical queries (1) mentioning the same particular application and (2) issued by P different users, a particular entity presenting in N historical queries out of the M historical queries can be determined as a public entity for the particular application. Alternatively or additionally, the particular entity will need to be present in N historical queries issued by Q different users out of the P users to qualify as a "public entity". In this example, M, N, P, and Q can be positive integers, where M is greater than or equal to N, and P is greater than or equal to Q. A "personal entity" means entities shown in queries specific to a user.

The public entities and/or personal entities for each application can be collected and/or stored in a corresponding entity file, along with associated metadata (e.g., fulfillment information, natural language understanding intent, all available identifiers of the public and/or personal entities including those defined/created by a user, and/or associated historical queries) to generate one or more entity files. For example, the one or more entity files can include a first entity file listing public and/or personal entities determined for a first application, a second entity file listing public and/or personal entities determined for a second application, an $n^{th}$ entity file listing public and/or personal entities determined for an $n^{th}$ application. The first entity log, for instance, can include the aforementioned metadata (e.g., fulfillment information) associated with each of the public and/or personal entities stored in the first entity log. Similar descriptions for the second entity file and other entity files are omitted herein. In some implementations, the entity file may not include entities that are neither public entities nor personal entities.

As a non-limiting example, the first entity file can be for the first application. The first entity file can include at least a first entry. The first entry of the first entity log, for example, can include a specific public entity and/or a total number of times (frequency) the specific public entity occurred concurrently with the first application in the aforementioned one or more historical queries. Optionally, the first entry can further include user IDs of different users that issued historical queries that each include both the specific public entity and the first application.

Optionally, the first entry of the first entity file can further include metadata associated with the specific public entity, such as fulfillment information (e.g., a deeplink) for performing one or more actions (e.g., a search of the specific public entity within the first application) associated with the specific public entity within the first application. Alternatively or additionally, the metadata associated with the specific public entity can include rendering information for rendering one or more suggestions each suggesting an action to be performed with respect to the specific public entity within the first application. Alternatively or additionally, the metadata associated with the specific public entity can include one or more natural language understanding (NLU) intents each capable of causing an automated assistant to perform an action associated with the specific public entity within the first application.

As a non-limiting example, the specific public entity can be song A and the first application can be a music app. In this example, the first entry of an entity file for the music app can be in a form of: <song A> <user 1, user 2, user 5, user 7> <20> <play>, where "song A" is the specific public entity accessible via the music app, "user 1, user 2, user 5, user 7" are the users from whom the historical queries mentioning both the music app and the specific public entity "song A" are collected, "play" is a NLU intent, and "20" is the number of times "song A" is associated with the music app in all the one or more historical queries. It's noted that in some circumstances, the first entry of the entity file for the music app can include more than one NLU intent associated with the public entity "song A", or can include other types of metadata (e.g., deeplinks).

As another non-limiting example, a second entity file can be for a second application, such as aforementioned digital wallet Y. The second entity file can include a first entry corresponding to a personal entity, and/or metadata associated with the personal entity. For instance, the personal entity can be "credit X" specific to a user, and the metadata can be fulfillment data for launching the digital wallet Y in a state where credit X specific to the user is ready (e.g., displayed) for use.

In various implementations, a user device (sometimes referred to as "client device", "client computing device", or "computing device") can include one or more applications. In these implementations, entity files for the one or more applications can be retrieved and stored locally at the user device. For example, the user device can include a first app, a second app, and a third app. In this example, a first entity file for the first app, a second entity file for the second app, and a third entity file for the third app can be retrieved and stored locally at the user device, where the first, second, and third entity files can be generated based on the final output of the one or more reducers described above. For instance, the first entity file for the first app, the second entity file for the second app, and the third entity file for the third app can be stored locally within an on-device repository of the user device.

In some implementations, the first entity file for the first app can include a first set of entities (public and/or personal) and associations between each of the first set of entities and fulfillment information for fulfilling one or more actions with respect to a corresponding entity of the first set of entities within the first app. The second entity file for the second app can include a second set of entities (public and/or personal) and associations between each of the second set of entities and fulfillment information for fulfilling one or more actions with respect to a corresponding entity of the second set of entities within the second app. The third entity file for the third app can include a third set of entities (public and/or personal) and associations between each of the third set of entities and fulfillment information for fulfilling one or more actions with respect to a corresponding entity of the third set of entities within the third app.

In some implementations, the first, second, and third entity files can be stored locally at the user device in response to determining that the first app, the second app, and the third app are installed at the user device. In some implementations, the first, second, and third entity files can be utilized (e.g., via an on-device search engine) to train a probability model in processing a given entity to predict a first probability that the given entity is associated with (e.g., accessible via) the first app, a second probability that the given entity is associated with the second app, and a third probability that the given entity is associated with the third app.

In some implementations, an association between an entity and fulfillment information for fulfilling one or more actions (e.g., a search) of the entity can be stored locally (e.g., in a form of entity log) at the user device, in response to determining that the entity is associated with an application installed at the user device. In some implementations, a plurality of associations can be stored locally at the user device, each associating a respective entity and corresponding fulfillment information for fulfilling one or more actions with respect to the respective entity within a corresponding application installed at the user device.

In some implementations, subsequent to the association between the entity and the fulfillment information for fulfilling the search (and/or another action) of the entity within the application being stored locally at the user device, a user query (i.e., an incomplete query) that indicates the entity but not the application may be received via the user device. In response to receiving the user query (e.g., "Assistant, open my credit card X") that indicates the entity but not the application, various implementations can access the stored association between the entity and the fulfillment information for fulfilling the search (or another action) of the entity within the application, in response to receiving the incomplete user query. Based on the stored association between the entity and the fulfillment information for fulfilling the search (or another action) of the entity within the application (e.g., "digital wallet"), various implementations can cause a suggestion (or one or more suggestions) to be rendered via the user device in a selectable format.

The suggestion, which is rendered via the user device in the selectable format, when selected, can cause the fulfillment information to be executed, so that the search (or another action defined by the fulfillment information) of the entity within the application is fulfilled. For example, the suggestion can be rendered in a form of a selectable graphical element that identifies the entity (e.g., "credit card X"), where the selectable graphical element can be embedded with a link (e.g., URL) that leads to the launch of the application (e.g., digital wallet Y) to show the entity (e.g., credit card X). Optionally, the selectable graphical element can include a card thumbnail of credit card X, or the selectable graphical element can be displayed along with the card thumbnail of credit card X within the same user interface.

In some implementations, determining that the entity is associated with the application comprises: processing, using a trained probabilistic model, an entity name of the entity to generate an output that indicates a plurality of probabilities each representing a likelihood that the entity is present in one of a plurality of applications installed at the user device. The trained probabilistic model can be trained based on the occurrence of one or more historical queries that are submitted via the one or more corresponding computing devices and that each include a corresponding entity name for the entity and a corresponding application name of the application. As a non-limiting example, in case where the plurality of applications installed at the computing device include a first application, a second application, and a third application, the output (i.e., generated by the trained probabilistic model in processing the entity name as input) can be a probability distribution, from which three probabilities are derived. The three probabilities can include a first probability representing a likelihood that the entity is present in the first application, a second probability representing a likelihood that the entity is present in the second application, and a third probability representing a likelihood that the entity is present in the third application.

By determining that an entity (e.g., credit card X) is associated with an application (e.g., digital wallet Y) and by identifying and storing an association between the entity and fulfillment information for fulfilling a search (or other action(s)) of the entity within the application, the on-device search engine (or other query recommendation system) can be responsive to an incomplete user query (i.e., query identifying the entity without identifying the application that provides access to the entity). For example, the on-device search engine of the user device can match the entity identified from the incomplete user query to public and/or personal entities in entity files stored within the on-device repository, to determine the application that provides access to the entity and to generate and render a suggestion suggesting to launch the application.

As another example, the on-device search engine of the user device can automatically complete a user query that partially identifies an entity and identifies no application, to identify the entity, based on matching the partially identified entity with the public and/or personal entities in entity files stored within the on-device repository. In this example, the automatically completed user query can be utilized to determine the application that provides access to the entity, and to generate and render a suggestion suggesting to launch the application.

As a further example, the on-device search engine of the user device can process an entity name of the entity identified from the user query which does not identify any application, using a trained probabilistic model, to generate an output that indicates one or more probabilities for the entity to be present in each of one or more application installed at the user device. Based on the generated output, the on-device search engine can generate and render one or more suggestions, as described above. In these ways, not only user experience is enhanced, but the chances of processing multiple user queries in order to successfully identify and/or trigger the corresponding application is reduced, which results in reduced consumption of computing and battery resources.

As a working example, a plurality of historical queries can be identified from one or more computing devices. The plurality of historical queries can be in a form of "search X-on-Y", or any other applicable format identifying both an application and an entity being present in the application. In other words, the plurality of historical queries identified from the one or more computing devices need to be explicit queries that each include both an entity name for an entity and an application name for an application that provides access to the entity.

The plurality of historical queries include, for instance, a first historical query generated based on a first user searching for (accessing, or another action such as tapping to pay) a particular entity (i.e., "credit card X") via a particular application (i.e., "digital wallet Y") that is installed at a first computing device. The first historical query can, for instance, be generated in form of "<credit card X> <digital wallet Y> <first user>", "<digital wallet Y> <credit card X> <first user>", "<credit card X> in <digital wallet Y> <first user>", or any other appropriate form. Here, "credit card X" is an entity name for the particular entity of "credit card X", and "digital wallet Y" is an application name for the particular application of "digital wallet Y". In some implementations, optionally or additionally, the first historical query can include, or be generated in association with, a user action defining user interaction with the credit card X within digital wallet Y. For instance, the first historical query can be associated with, or determined from, a user action of "searching" credit card X within digital wallet Y.

Alternatively or additionally, the plurality of historical queries can include a second historical query generated based on a second user (the same as or different from the first user) searching for "movie A" using a search engine of a movie app B, where the movie app B is installed at a second computing device (the same as or different from the first computing device). The second historical query can be generated, for instance, in a form of "<movie A><movie app B> <second user>" or any other appropriate form. The first and second historical queries described herein are for illustrative purposes and shall not be considered as limiting the scope of the present disclosure.

The plurality of historical queries can be processed to generate one or more training instances to train a model (e.g., the aforementioned probabilistic model) in processing (or responding to) queries that do not identify any application name. The model can be a machine learning model.

In some implementations, the plurality of historical queries can be divided, using a map-reduce engine, to generate a set of query files, where each query file of the set includes one or more historical queries from the plurality of historical queries. Each query file can be assigned to a corresponding mapper (i.e., a processing module) of a set of mappers, where the corresponding mapper can process a respective query file to generate a corresponding intermediate output (e.g., one or more key-value pairs in which an application can be a key and one or more entities associated with the application can be value(s) corresponding to the key).

The set of intermediate outputs generated by the set of mappers can be processed by one or more reducers as input, to generate a final output indicating public and/or personal entities determined from the plurality of historical queries. It's noted that the number of intermediate outputs does not necessarily equate the number of reducers. The number of reducers utilized in processing the set of intermediate outputs may be based on the number of different keys present in the set of intermediate outputs.

In some implementations, the final output can be processed to generate one or more entity files, where each of the one or more entity files is for a corresponding application, and where each of the one or more entity files include one or more public and/or personal entities present in the corresponding application. In some implementations, metadata associated with fulfilling (partially or fully) one or more actions (e.g., a search) of a public or personal entity within the corresponding application can be retrieved/determined and be stored in the entity file that includes the public or personal entity. In some implementations, an entity file for an application can be stored locally at a user device in response to determining that the application is installed at the user device. In this case, if the user device includes a first application and a second application, a first entity file for the first application and a second entity file for the second application can be stored locally at the user device in response to determining that the first application and the second application are installed at the user device.

As a non-limiting example, based on the final output generated by the one or more reducers, "credit card X" can be determined as a personal entity that is present in "digital wallet Y". In this example, an entity file for "digital wallet Y" can be stored locally at a local device in response to determining that "digital wallet Y" is installed at the local device. Alternatively, an association between "credit card X" and "digital wallet Y" can be determined, and be stored locally at the local device in response to determining that the "digital wallet Y" is installed at the local device. In some implementations, fulfillment information for fulfilling an action (e.g., searching) with respect to "credit card X" within "digital wallet Y" can be retrieved and be stored locally in association with "credit card X" at the local device.

Continuing with this working example, a user query (e.g., typed input of "credit card X" or audio input of "Assistant, credit card X, please") can be subsequently received at the local device via an on-device search engine (which can be a unified search engine not specific to any applications installed at the local device, or via an automated assistant or other chatbot). The user query is an incomplete query that identifies only the entity ("credit card X") but no application. In response to receiving the incomplete query, the on-device repository can be searched to determine a public or personal entity that matches the entity identified by the incomplete query, so that an application that provides access to the entity can be identified. In some implementations, the entity may match a public entity (e.g., the public entity being present in different entity files each for a different application) that is associated with different applications. In these implementations, the aforementioned probabilistic model can process, an entity name of the entity as input, to generate an output indicating a plurality of probabilities each suggesting a likelihood the entity is present in a corresponding application of a plurality of applications installed at the local device. Based on the plurality of probabilities, one or more application can be selected from the plurality of applications, and one or more suggestions suggesting the user to access the entity via the one or more applications can be generated based on fulfillment information from the on-device repository that enables fulfillment of an action of the entity within each of the one or more selected applications. The one or more suggestions can be rendered to a user of the local device as a search result responsive to the incomplete query from the user. Each of the one or more suggestions, for example, can be rendered in a selectable format that, when selected, causes corresponding fulfillment information to be executed, so that a corresponding application is triggered to provide access to the entity.

The above is provided merely as an overview of some implementations. Those and/or other implementations are disclosed in more detail herein.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

The above and other aspects, features, and advantages of certain implementations of the present disclosure will be more apparent from the following description taken in conjunction with the accompanying drawings. In the drawings:

FIG. 2 illustrates an example method for implicit triggering of an application to perform an action associated with an entity identified by an incomplete query, in accordance with various implementations.

FIG. 3 illustrates an example method for determining public and/or personal entities, in accordance with various implementations.

FIG. 4 illustrates another example method for implicit triggering, in accordance with various implementations.

FIG. 5 illustrates a further example method for implicit triggering, in accordance with various implementations.

DETAILED DESCRIPTION

The following description with reference to the accompanying drawings is provided for understanding of various implementations of the present disclosure. It's appreciated that different features from different implementations may be combined with and/or exchanged for one another. In addition, those of ordinary skill in the art will recognize that various changes and modifications of the various implementations described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used to enable a clear and consistent understanding of the present disclosure. Accordingly, it should be apparent to those skilled in the art that the following description of various implementations of the present disclosure is provided for the purpose of illustration only and not for the purpose of limiting the present disclosure as defined by the appended claims and their equivalents.

Figure 1A:
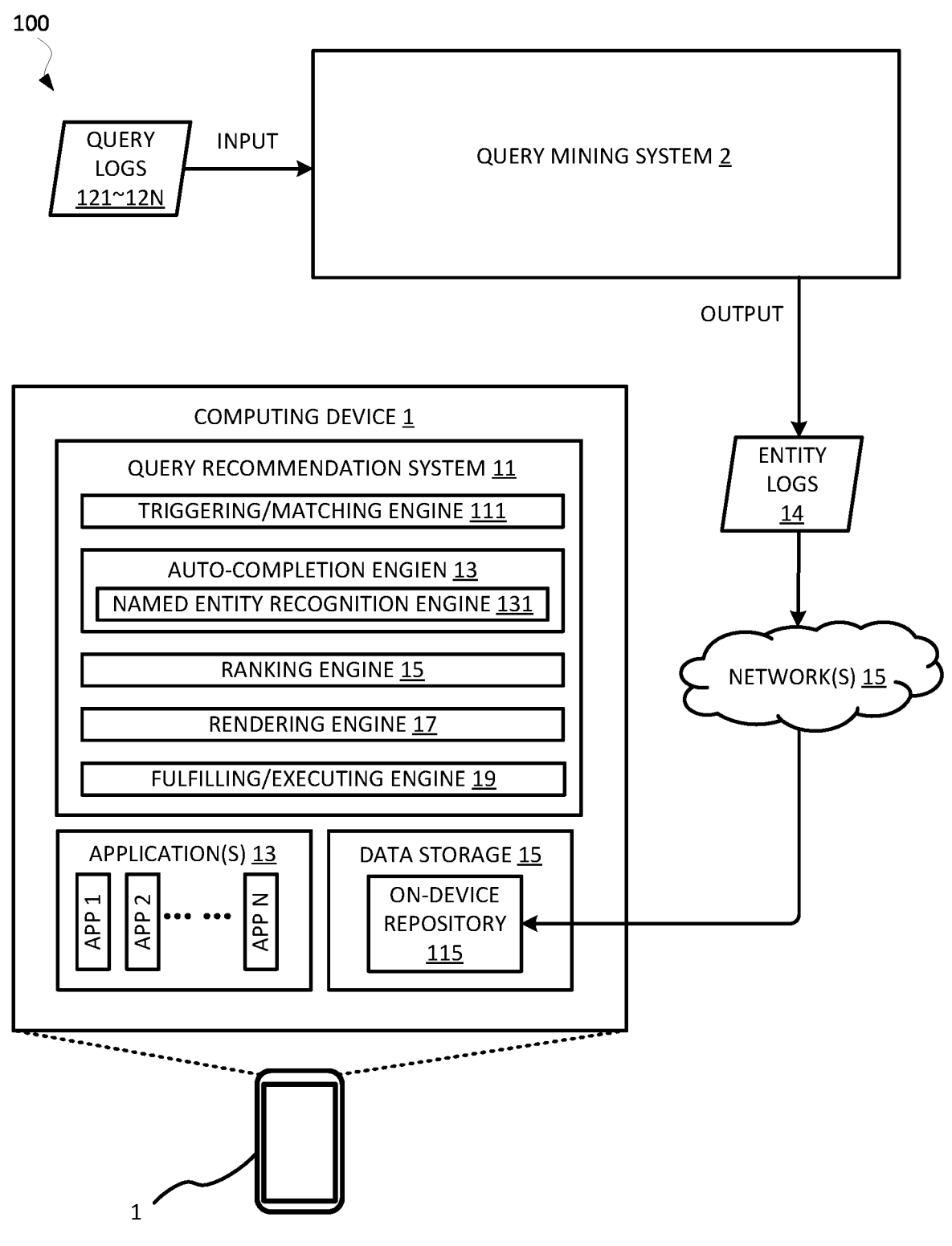
FIG. 1A depicts a block diagram of an example environment that demonstrates various aspects of the present disclosure, and in which implementations disclosed herein may be implemented.

FIG. 1A depicts a block diagram of an example environment 100 that demonstrates various aspects of the present disclosure, and in which implementations disclosed herein may be implemented. As shown in FIG. 1A, the example environment 100 can include: a computing device 1, and a query mining system 2 in communication with the computing device 1. The query mining system 2 can be in communication with the computing device 1 via one or more networks 15. The computing device 1 (may also be referred to as "client device", "user device" or "local device") can be, for example, a cell phone, a laptop, a desktop, a notebook computer, a tablet, a smart TV, a messaging device, or a personal digital assistant (PDA), and the present disclosure is not limited thereto. The query mining system 2 can be, or can otherwise include, a parallel data processing system such as MapReduce that assigns processing resources to function as a plurality of mappers and one or more reducers, where the plurality of mappers can process input data in parallel using one or more map functions to generate a plurality of intermediate output, and the one or more reducers can process the plurality of intermediate output in parallel to generate a final output (e.g., indicating one or more public entities and/or one or more personal entities for each of one or more applications). More descriptions of the query mining system 2 can be found later in this specification.

In various implementations, the computing device 1 can include a query recommendation system 11, one or more applications 13, and/or a data storage 15. The computing device 1 can further include one or more user interface input devices (not shown) such as a keyboard, pointing devices such as a mouse, trackball, touchpad, or graphics tablet, a scanner, a touch screen incorporated into the display, audio input devices such as voice recognition systems, microphones, and/or other types of input devices. The computing device 1 can further include one or more user interface output devices such as a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display (e.g., audio data) via audio output devices.

In various implementations, the query recommendation system 11 can be, or can include an on-device search engine, including: a triggering/matching engine 111, an auto-completion engine 113, a ranking engine 115, a rendering engine 117, and/or a fulfilling/executing engine 119. The one or more applications 13 can include, for example, app 1 (e.g., a social media app), app 2 (e.g., a music application), . . . , and app N (e.g., digital wallet). Optionally, the one or more applications 13 can further include an automated assistant application (sometimes referred to as "automated assistant", "chatbot", etc.). The data storage 15 can include, for example, an on-device repository 115. The on-device repository 115 can include, for example, one or more public entities stored in association with metadata (e.g., fulfillment data) of the one or more public entities, and/or one or more personal entities stored in association with metadata of the one or more personal entities. In some implementations, the one or more public entities, and/or the one or more personal entities, can be determined based on the aforementioned final output of the query mining system 2. More descriptions of the public or personal entities can be found later in this disclosure.

The triggering/matching engine 111 can process an incomplete query that identifies an entity but no application for accessing the entity, to determine whether the incomplete query triggers any of the one or more applications 13, and/or to determine whether the incomplete query matches any entry from the one or more public or personal entities stored in the on-device repository 115. The auto-completion engine 113 can, in response to the triggering/matching engine 111 determining that the incomplete query matches a particular entity from the one or more public or personal entries from the on-device repository 115, determine at least one application associated with the particular entity based on entries in the on-device repository 115 that each stores the particular entity in association with a corresponding application (and/or metadata such as fulfillment information for fulfilling an action with respect to the particular entity within the corresponding application).

The auto-completion engine 113 can automatically generate one or more complete queries based on the particular entity and one or more determined applications (and/or the associated fulfillment information). The ranking engine 115 can rank the one or more complete queries based on one or more ranking criteria (e.g., frequency, click-through rate, etc., default setting by a user that provides the incomplete query). Alternatively or additionally, the ranking engine 115 can rank the at least one application, to select one or more top ranked applications from the at least one application to generate corresponding suggestion(s). The rendering engine 117 can render the one or more top ranked complete queries determined by the ranking engine 15, for example, using a drop-down menu (or any other appropriate format such as one or more graphical user interface elements). In some implementations, the rendering engine 117 can render the one or more complete queries (or a portion thereof, such as the top ranked ones) in a manner where each of the one or more rendered complete queries is embedded with fulfillment information (e.g., a deeplink). Alternatively or additionally, the rendering engine 117 can generate and render suggestion(s) responsive to the incomplete query, without rendering top ranked complete queries. Each of the rendered suggestion(s), when selected, can cause execution of fulfillment information for fulfilling an action of the particular entity within a corresponding application.

The fulfillment information, for instance, can enable an application that corresponds to the particular entity identified by the incomplete query, to be triggered. The fulfillment information can further enable a search (or other action) for the entity to be performed within the triggered application. The fulfilling/executing engine 119 can, in response to a user selecting one of the one or more rendered complete queries, utilize the fulfillment information of the selected complete query, to cause the application that corresponds to the selected entity to be triggered and/or the search (or other action) for the entity to be performed within the triggered application. As a result, the query recommendation system 11 allows the user to implicitly trigger a desired application (i.e., the triggered application) by providing an incomplete query that identifies an entity but not any application. In other words, the user does not need to provide a complete query that identifies both the entity and the desired application in order to access the entity within the desired application.

In some implementations, the incomplete query can be an audible query identifying a desired entity but not an application to access the desired entity. The audible query can be received via an automated assistant application (sometimes referred to as "automated assistant" as mentioned above, or can be otherwise be a chatbot, etc.) installed at, or otherwise accessible, via the computing device 1. In some implementations, the automated assistant can include a plurality of components including an automatic speech recognition (ASR) engine, a text-to-speech (TTS) engine, a natural language understanding (NLU) engine, and/or a fulfillment engine. The ASR engine can process audio data that captures a spoken utterance to generate a speech recognition of the spoken utterance. The NLU engine can determine semantic meaning(s) of audio (e.g., the aforementioned audio data capturing the spoken utterance) and/or a text (e.g., natural language content from a message or the aforementioned speech recognition that is converted by the ASR engine from the audio data), and decompose the determined semantic meaning(s) to determine intent(s) and/or parameter(s) for an assistant action. For instance, the NLU engine can process natural language content of "Weather today in Louisville?", to determine a natural language understanding (NLU) intent (e.g., Internet search) and/or parameters (e.g., search parameters including: "weather", "today", and "Louisville", or "Weather today in Louisville?") for an assistant action (e.g., search the Internet for the weather in Louisville today).

In some implementations, the NLU engine can resolve the intent(s) and/or parameter(s) based on a single utterance of a user and, in other situations, prompts can be generated based on unresolved intent(s) and/or parameter(s). In this latter situation, the generated prompts can be rendered to the user to receive user response(s), where the user response(s) to the rendered prompt(s) can be utilized by the NLU engine in resolving intent(s) and/or parameter(s). Optionally, the NLU engine can work in concert with a dialog file manager engine (not illustrated) that determines unresolved intent(s) and/or parameter(s). For instance, the dialog file manager engine can be alternatively or additionally utilized to generate the aforementioned prompt(s). In some implementations, the NLU engine can utilize one or more NLU machine learning models in determining intent(s) and/or parameter(s).

In various implementations, the fulfillment engine of the automated assistant (or a fulfillment engine of the client automated assistant application, which is not illustrated) can receive an intent and/or parameter(s) of the intent, to fulfill the intent by performing a corresponding assistant action. As a non-limiting example, the fulfillment engine can receive the aforementioned intent of Internet search and the aforementioned search parameter of "Weather today in Louisville?", to cause a search engine of the client device 11 to search the Internet for "Weather today in Louisville?". In this example, the fulfillment engine can fulfill the intent by: (1) causing the search engine to search the Internet for the user query, i.e., "Weather today in Louisville?"), (2) generating fulfillment information (e.g., "it's cloudy outside, with a temperature of 26° C."), based on a search result (e.g., "Louisville, KY, Monday 11:00 am, cloudy, 26° C.") of the search, and/or (3) rendering the fulfillment information to the user of the computing device 1. As another non-limiting example, the fulfillment engine can receive an intent and/or parameter(s) for an assistant action that causes a thermostat in the living room to set room temperature at 72 F. In this example, the fulfillment engine can fulfill the intent by generating and forwarding a control signal to the thermostat in the living room, where the control signal causes the thermostat to set the room temperature at 72 F.

Optionally, when the NLU engine cannot resolve the intent(s) and/or cannot determine all parameter(s) for the intent(s), to fulfill an assistant action, the fulfillment engine can generate a default response, such as "Sorry, I don't understand. Please try again. In this case, the default response can be customized based on functions or a type of the automated assistant.

In some implementations, the TTS engine can convert a text (e.g., the aforementioned fulfillment information of "it's cloudy outside, with a temperature of 26° C.") to a synthesized speech using a particular voice. The synthesized speech, for instance, can be generated by using one or more trained speech synthesis neural network models to process the text. The synthesized speech can be audibly rendered via hardware speaker(s) of the computing device 1 (e.g., a stand-alone speaker) or via another device (e.g., a cell phone). In some implementations, the automated assistant can be in communication with a cloud-based automated assistant via one or more networks. The cloud-based automated assistant can have a plurality of cloud-based components, the same as or similar to the plurality of components of the automated assistant, while possessing stronger processing capabilities.

In some implementations, the automated assistant can further include the aforementioned query recommendation system 11. In some other implementations, the query recommendation system 11 can be included in, or be accessible via, a unified search engine having a search interface to receive, e.g., the aforementioned incomplete query, from a user of the computing device 1.

Figure 1B:
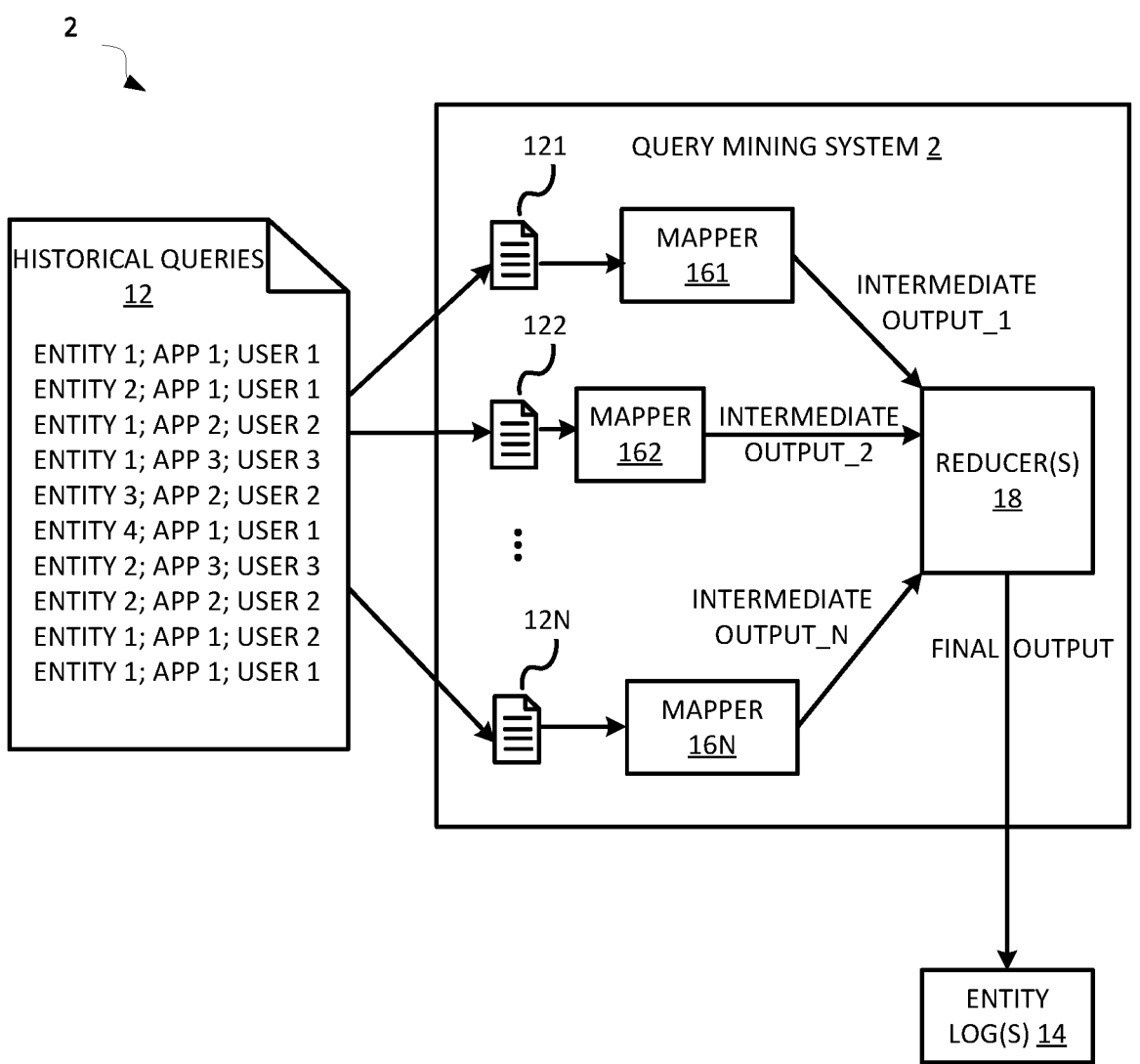
FIG. 1B depicts a flow chart showing determination of public and/or personal entities using a query mining system, in accordance with various implementations.

FIG. 1B depicts a flow chart showing determination of public and/or personal entities using a query mining system (e.g., the query mining system 2 included in the example environment 100 of FIG. 1A), in accordance with various implementations. As shown in FIG. 1B, the query mining system 2 can include one or more mappers (e.g., mapper 161, mapper 162, . . . , mapper 16N) and one or more reducers 18. The query mining system 2 can further include a data-splitting engine (not illustrated) that splits a plurality of historical queries 12 into a plurality of query files (e.g., a first query file 121, a second query file 122, . . . , and an Nth query file 12N). The plurality of historical queries 12 can be explicit queries received from one or more users, where the explicit queries can be received via one or more applications installed at one or more computing devices.

As a non-limiting example, as illustrated in FIG. 1B, the plurality of historical queries 12 can include: a first query submitted by user 1 within app 1 searching for entity 1, a second query submitted by user 1 within app 1 searching for entity 2, a third query submitted by user 2 within app 2 searching for entity 1, a fourth query submitted by user 3 within app 3 searching for entity 1, a fifth query submitted by user 2 within app 2 searching for entity 3, a sixth query submitted by user 1 within app 1 searching for entity 4, a seventh query submitted by user 3 within app 3 searching for entity 2, an eighth query submitted by user 2 within app 2 searching for entity 2, a ninth query submitted by user 2 within app 1 searching for entity 1, a tenth query submitted by user 1 within app 1 searching for entity 1, and/or one or more additional queries. The data-splitting engine can divide or split the plurality of historical queries 12 into a plurality of query files 121, 122, . . . , 12N, where each of the plurality of query files 121, 122, . . . , and 12N include one or more historical queries from the plurality of historical queries 12.

Continuing with the above non-limiting example, query file 121 can include the first query (e.g., "Entity 1; App 1; User 1") and the second query ("Entity 2; App 1; User 1"), query file 122 can include the third query ("Entity 1; App 2; User 2"), . . . , and query file 12N can include a historical query listed at the very end of the plurality of historical queries 12. The data-splitting engine can assign the query file 121 to mapper 161 for processing by the mapper 161, assign the query file 122 to mapper 162 for processing by the mapper 162, . . . , and assign the query file 12N to the mapper 16N for processing by the mapper 16N. The mapper 161 can process the query file 121 as input to generate intermediate output 1, the mapper 162 can process the query file 122 as input to generate intermediate output 2, . . . , and the mapper 16N can process the query file 12N to generate intermediate output N.

The intermediate output 1, 2, . . . , and N can each indicate one or more entity-application pairs. The intermediate output 1, 2, . . . , and N can be shuffled and be processed using the one or more reducers 18. The one or more reducers 18 can process the intermediate output 1, intermediate output 2, . . . , intermediate output N, as input, to generate a final output indicating one or more public entities, for each of the one or more application, that occurred more than a first threshold number of times in the plurality of historical queries 12. Alternatively or additionally, the one or more public entities can be determined as being submitted by over a second threshold number of users from whom the plurality of historical queries 12 were collected. Alternatively or additionally, the final output can indicate one or more personal entities, for each of the one or more applications, that are each specific to a particular user of the one or more users.

In some implementations, the final output can be applied to generate one or more entity files 14 (sometimes referred to as "entity logs"), where each of the one or more entity files 14 is specific to a corresponding application, out of the one or more applications (identified in the explicit queries, or known as "historical queries"). Each of the one or more entity files 14 can list or include all the public entities and/or all the personal entities determined from the plurality of historical queries 12 that are specific to the corresponding application, a count of the public entities or personal entities occurring concurrently with the corresponding application in the plurality of historical queries 12, and/or fulfillment information as discussed previously. As a non-limiting example, a first entity file (of the one or more entity files 14) can be associated with App 1, and can include a first entry identifying Entity 1 (which is determined as a public entity) that is present in App 1, and a second entry identifying Entity 4 (which is determined as a personal entity) that is present in App 1. In this non-limiting example, the first entry of the first entity file for App 1 can further include an association between Entity 1 and fulfillment information (e.g., deeplink) for fulfilling an action of Entity 1 within App 1 (and/or other metadata such as NLU intent), and the second entry of the second entity file for App 1 can further include an association between Entity 4 and fulfillment information for fulfilling an action (e.g., search) of Entity 4 within App 1.

In some implementations, the fulfillment information for searching (or performing another action with respect to) Entity 1 (or Entity 4) within App 1 can be retrieved, e.g., from historical data (e.g., one or more previous occurrences in which one or more users performed a search for Entity 1 or Entity 4 within App 1) associated with the plurality of historical queries 12. As one example, the fulfillment information can be a URL link that, when selected, causes App 1 to be launched, and Entity 1 to be searched within the launched App 1. As another example, the fulfillment information can include an intent and/or parameters that, when selected, causes the aforementioned automated assistant to launch App 1 and perform a search for Entity 1 within the launched App 1.

Based on the one or more applications 13 installed at the computing device 1, one or more of the entity files 14 can be selected and stored locally at the computing device 1. For example, in response to determining that the computing device 1 is installed with App 1, App 2, and App 3, entity file for App 1, entity file for App 2, and entity file for App 3 can be selected and be stored locally at the on-device repository 115 of the computing device 1.

Continuing with the above example, in some implementations, the entity file for App 1, the entity file for App 2, and the entity file for App 3 can be applied to generate one or more training instances to train a probabilistic model. The trained probabilistic model can process an entity name of a given entity as input, to predict three probabilities. The three probabilities can include a first probability indicating a likelihood that the given entity is present in App 1, a second probability indicating a likelihood that the given entity is present in App 2, and a third probability indicating a likelihood that the given entity is present in App 3. Based on the three probabilities, one or more of App 1, App 2, and App 3 can be determined and/or selected to access the given entity.

Alternatively, in some implementations, based on the one or more entity files 14, one or more entries each mapping a public or personal entity to fulfillment information for performing an action (e.g., search) with respect to the public or personal entity within a corresponding application can be generated, and be further stored within the on-device repository 115. Subsequent to the one or more entries generated using the one or more entity files 14 (and/or using associated metadata) being stored in the on-device repository 115, the one-device repository 115 can be utilized to determine, in response to receiving an incomplete query identifying a particular entity but no particular application that is associated with the particular entity, whether the incomplete query matches any of the one or more entries or entities in the on-device repository 115.

FIG. 2 illustrates an example method for implicit triggering, in accordance with various implementations. For convenience, the operations of the method 200 are described with reference to a system that performs the operations. The system of method 300 includes one or more processors and/or other component(s) of a client device and/or of a server device. Moreover, while operations of the method 200 are shown in a particular order, this is not meant to be limiting. One or more operations may be reordered, omitted, or added.

Referring to FIG. 2, in various implementations, at block 201, the system can determine that an entity is associated with an application. In some implementations, the entity here can be a public entity, or can be a personal entity. A "public entity" means, given a plurality of historical queries, the entity is present in over a first threshold number of historical queries, among the plurality of historical queries, that were issued/submitted by over a second threshold number of users. In some implementations, public entities for each application installed at a user device can be determined. A "personal entity" means an entity collected from the plurality of historical queries that is specific to a user. As a non-limiting example, the entity can be a plant called "daffodil", and the application can be a "digital album" installed at the user device of a particular user.

In various implementations, at block 203, the system can determine fulfillment information for fulfilling an action (e.g., search) of the entity within the application. As a non-limiting example, the fulfillment information can include a deeplink that, when selected, causes the action of the entity to be performed within the application. Continuing with the above non-limiting example, the system can determine, from historical data, that the particular user searched for "daffodil" with "digital album" on a certain date. In this example, metadata (e.g., fulfillment data causing a search of "daffodil" with "digital album") associated with an action of the user searching for "daffodil" with "digital album" can be retrieved.

In various implementations, at block 205, the system can store, in response to determining that the entity is associated with the application, an association between the entity and the fulfillment information for fulfilling the search of the entity within the application. The system can store such association as an entry in an on-device repository accessible at, or via, a local device. Continuing with the above non-limiting example, the system can store an association between the entity "daffodil" and the fulfillment information for fulfilling the search of the entity "daffodil" within the application "digital album" in the on-device repository.

In various implementations, at block 207, subsequent to the association being stored (e.g., in the on-device repository), the system can receive user input from a user that indicates the entity but not the application (or not any application). The user input here is therefore an incomplete query. Continuing with the above non-limiting example, the user input that indicates the entity but not the application can be, for instance, an audible input of "Assistant, show me the daffodil", or "Assistant, show me the *narcissus*". Alternatively, the user input that indicates the entity but not the application can be, for instance, a typed input received from the user via an on-device search engine that is not specific to any application installed at the user device. Continuing with the above non-limiting example, the user input that indicates the entity but not the application can be, for instance, a typed input of "daffodil" or "*narcissus*".

In various implementations, at block 209, in response to receiving the user input that indicates the entity but not the application, the system can cause a suggestion to be rendered in a selectable format, based on the stored association between the entity and the fulfillment information for fulfilling the search of the entity within the application. For example, the system, in response to receiving the user input that indicates the entity but not the application, can access the on-device repository storing the association between the entity and the fulfillment information for fulfilling the search of the entity within the application, to determine the fulfillment information for fulfilling the search of the entity within the application. Based on the fulfillment for fulfilling the search of the entity within the application, the system can generate a suggestion and cause the suggestion to be rendered to the user. The suggestion can be a selectable element embedded with the fulfillment information, where the suggestion, when selected, causes the fulfillment information to be executed, so that the application can be triggered to be launched and/or an action (e.g., search) of the entity can be performed within the application.

It's noted that the system described herein can match an incomplete query of "Assistant, show me the daffodil" to an association stored in an entry of the on-device repository that associates an entity of "*narcissus*" with an application of "digital album", based on "daffodil" being a common name of "*narcissus*" or is often used interchangeably with "*narcissus*".

FIG. 3 illustrates an example method 300 for determining public and/or personal entities, in accordance with various implementations. For convenience, the operations of the method 300 are described with reference to a system that performs the operations. The system of method 300 includes one or more processors and/or other component(s) of a client device and/or of a server device. Moreover, while operations of the method 300 are shown in a particular order, this is not meant to be limiting. One or more operations may be reordered, omitted, or added.

Referring to FIG. 3, in various implementations, at block 301, the system can identify occurrence of one or more historical queries submitted via one or more computing devices, where each of the one or more historical queries includes an entity name for an entity and an application name of an application that corresponds to the entity. The entity name for the respective entity can be, for instance, a name (official, unofficial, etc.) of the respective entity, an identifier of the respective entity, or can be in any other appropriate format to identify or characterize the respective entity. The application name for the respective entity can be, for instance, an application nickname (e.g., E-Wallet for "digital wallet"), an application name synonym (e.g., DW for "digital wallet"), an application type name (e.g., wallet for "digital wallet"), or can be in any other appropriate format to identify or characterize the respective application. It's noted that the entity name or application name is not limited to descriptions herein. Optionally, the one or more historical queries can further include, for each of the one or more historical queries, a user ID for a user submitting the corresponding historical query, e.g., to determine whether the corresponding history query includes a personal entity. In some implementations, a total number of the one or more historical queries can be in the order of hundreds or thousands or even more. In these implementations, the one or more historical queries can be processed in parallel using a Mapreduce model/system.

In various implementations, at block 303, the system can split the one or more historical queries to generate one or more query files. Each query file can have a corresponding group of historical queries). As a non-limiting example, the one or more historical queries can be split to generate a first query log, a second query log, . . . , and a Nth query log, where each query file includes one or more of the aforementioned historical queries that each explicitly includes an entity name for an entity and an application name of an application that corresponds to the entity.

In various implementations, at block 305, the system can process each of the one or more query files using a corresponding mapper, to generate a plurality of intermediate outputs. Given the non-limiting example above, the system can include N mappers to respectively process the first query log, the second query log, . . . , and the Nth query log, to correspondingly generate N intermediate outputs (e.g., entity-application pairs), where N is greater than or equal to 2.

In various implementations, at block 307, the system can process the plurality of intermediate outputs using one or more reducers, to generate a final output, where the final output can indicate, for each application present in the occurrence of one or more historical queries, one or more public entities (and/or one or more personal entities) that are present in a corresponding application. As a non-limiting example, given only two applications (i.e., first app and second app) being present in the occurrence of one or more historical queries, the N intermediate outputs can be shuffled and processed by, e.g., two reducers that includes a first reducer and a second reducer. In this example, the first reducer can process one or more of the N intermediate outputs associated with the first app and the second reducer and process the rest of the N intermediate outputs associated with the second app, to generate a final output that indicate public and/or personal entities for the first app and public and/or personal entities for the second app. Based on the final output, an entity file for the first app and an entity file for the second app can be determined and/or generated.

FIG. 4 illustrates another example method for implicit triggering, in accordance with various implementations. For convenience, the operations of the method 400 are described with reference to a system that performs the operations. The system of method 400 includes one or more processors and/or other component(s) of a client device and/or of a server device. Moreover, while operations of the method 400 are shown in a particular order, this is not meant to be limiting. One or more operations may be reordered, omitted, or added.

Referring to FIG. 4, in various implementations, at block 401, the system can receive user input from a user that identifies an entity (e.g., content such as "credit card X") but not any application to access the entity.

In various implementations, at block 403, the system can determine whether the entity matches any public entity (or personal entity) stored in an on-device repository of a client device. The on-device repository can include a plurality of entries each storing an association between a public or personal entity with an explicit query identifying an action previously performed with respect to the public or personal entity within a corresponding application installed at the client device. Optionally, each of the plurality of entries can further include fulfillment information for fulfilling the action previously performed with respect to the public or personal entity within the corresponding application installed at the client device.

In various implementations, at block 405, the system can determine, in response to determining that the entity matches a public entity (or personal entity) within the on-device repository, automatically complete the user input to generate a complete query that identifies both the public entity (or the personal entity) and an application within which the public entity (or the personal entity) is present.

In various implementations, at block 407, the system can render the complete query to a user of the client device for the user to select or confirm the complete query.

In various implementations, the system can further receive additional user input that selects the complete query, and cause an action of the entity to be performed within the application in response to receiving the additional user input that selects the complete query. For example, in response to receiving the additional user input that selects the user query that identifies both the entity and the application, the system can cause the application to be launched and a search of the entity within the application to be performed.

FIG. 5 illustrates a further example method for implicit triggering, in accordance with various implementations. For convenience, the operations of the method 500 are described with reference to a system that performs the operations. The system of method 500 includes one or more processors and/or other component(s) of a client device and/or of a server device. Moreover, while operations of the method 500 are shown in a particular order, this is not meant to be limiting. One or more operations may be reordered, omitted, or added.

Referring to FIG. 5, in various implementations, at block 501, the system can receive, via a client device, user input identifying an entity but not an application to access the entity. The user input can be received, for instance, via an on-device system (such as a unified search engine, an automated assistant, an operating system, etc.) of the client device. The user input, as non-limiting examples, can be a typed input (e.g., "song X" which includes an entity name "Song X" but does not include any information about which application is to be triggered to search for or play "song X"), or can be an audio input such as "Assistant, play song X" (same here, only entity name "song X" and no application or application name is identified to play "song X").

In various implementations, at block 503, the system can process the user input identifying the entity but not the application, using a probabilistic model as input, to generate an output. The output can, for each of one or more applications installed at the client device, indicate a likelihood (often in the form of a probability) that the entity is present in a corresponding application of the one or more applications that are installed at the client device. For example, given a typed input of "song X", the system can process such typed input, using a trained probabilistic model, to generate an output that includes a first probability for a first application, a second probability for a second application, and a third probability for a third application. The first probability for the first application can indicate the likelihood that the entity (e.g., "song X") is present within (or otherwise accessible via) the first application. The second probability for the second application can indicate the likelihood that the entity (e.g., "song X") is present within (or otherwise accessible via) the second application. The third probability for the third application can indicate the likelihood that the entity (e.g., "song X") is present within (or otherwise accessible via) the third application. It's noted that the first, second, and third applications here can be all applications, or a portion of all the applications installed at the client device.

In various implementations, at block 505, the system can determine, based on the output, a particular application to access the entity. Continuing with the "song X" example above. The first, second, and third probability can be, for instance, 0.7, 0.2, and 0.1, respectively. In this case, the first application (for which the first probability, i.e., 0.7, is predicted) can be determined as the particular application to access the entity of "song X" based on the first probability exceeding a predetermined threshold (which can be for instance 0.6) and/or being the top ranked probability when compared with other probabilities (e.g., 0.2 and 0.1) included in the output. In other words, in this example, the second or third application will not be determined as being suitable or being the particular application for accessing the entity "song X".

In various implementations, at block 507, the system can determine fulfillment information for fulfilling a search of the entity within the particular application. For example, the system can retrieve such fulfillment information from a historical query or action that is stored in an on-device repository to fulfill the search of the entity within the particular application. The fulfillment information can be, for instance, a deeplink or natural language intent that, when executed, causes the entity to be searched within the particular application.

In various implementations, at block 509, the system can generate and cause a suggestion embedded with the fulfillment information to be rendered in a selectable format (e.g., a selectable graphical user interface element), responsive to the user input, for selection by a user. Continuing with the "song X" example above, the suggestion can, for instance, include or display an identifier for the first application (which is determined as the particular application to access the entity "song X"), where the identifier can be a symbol representing the first application (and/or an application name of the first application) and displayed along with the user input of "song X" in a selectable manner. Alternatively, the suggestion can be selectable and include natural language content describing both the entity ("song X") and the particular application ("first application") that is determined to access the entity. For instance, the suggestion can be "search song X in the first application" displayed visually in a selectable manner.

In various implementations, at block 511, the system can, in response to receiving additional user input that selects the suggestion embedded with the fulfillment information, execute the fulfillment information to perform the search of the entity within the particular application. Continuing with the "song X" example above, in response to receiving a click or audio data that selects the suggestion (e.g., "search song X in the first application" or an icon of the first application displayed responsive to and/or along with the user input of "song X"), fulfillment information associated with or embedded in the suggestion can be executed. The execution of the fulfillment information results in the search of the entity to be performed within the particular application. Alternatively, the execution of the fulfillment information results in the particular application to be launched first and then the search of the entity to be performed within the particular application.

Figure 6:
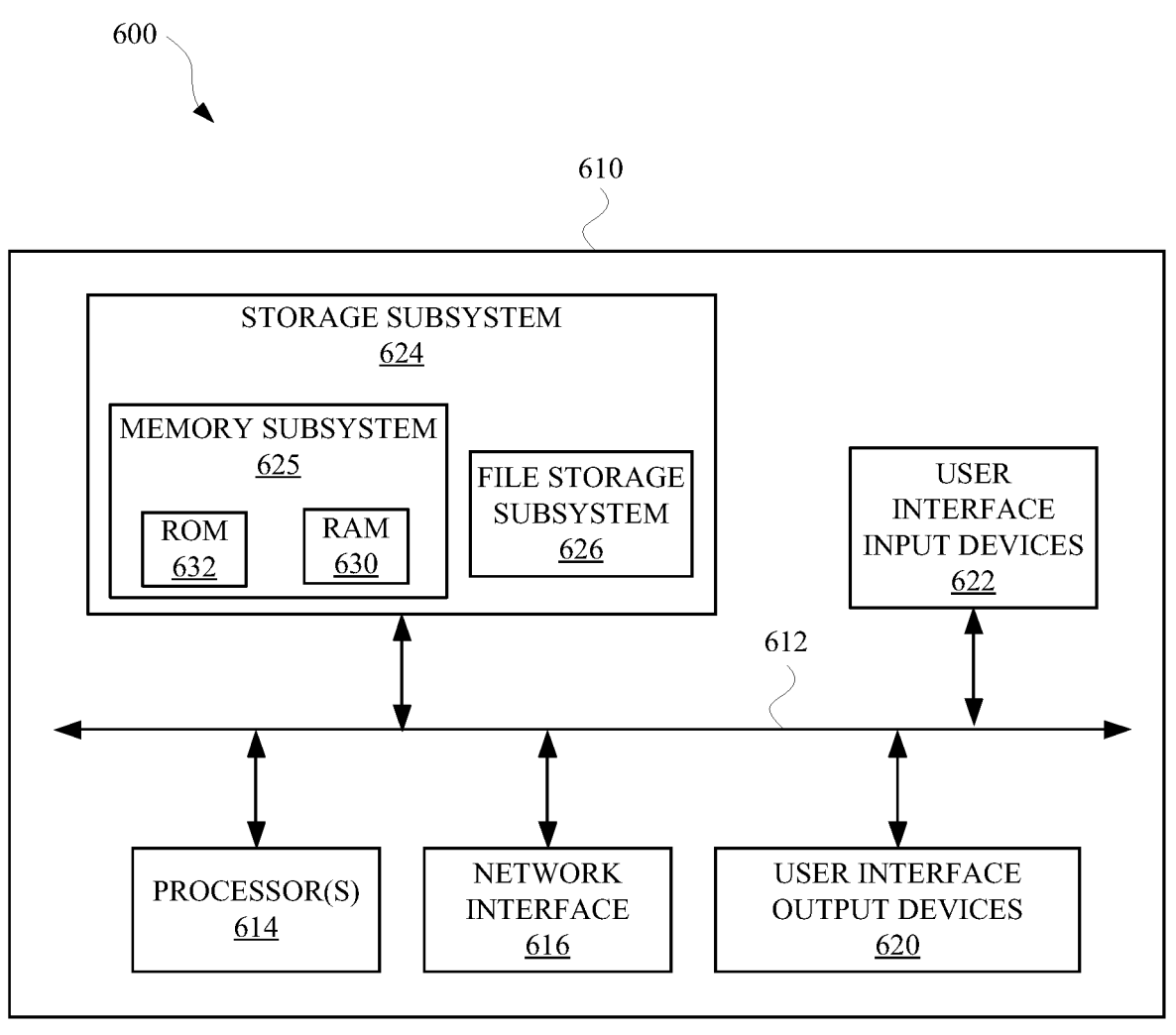
FIG. 6 illustrates an example architecture of a computing device, in accordance with various implementations.

FIG. 6 is a block diagram of an example computing device 610 that may optionally be utilized to perform one or more aspects of techniques described herein. In some implementations, one or more of a client computing device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

In various implementations, a computer-implemented method is provided, where the method include: determining that an entity is associated with an application. In some implementations, determining that the entity is associated with the application can be based on identifying occurrence of one or more historical queries submitted via one or more corresponding computing devices. Each of the one or more historical queries can include an entity name and a corresponding application name. For instance, each of the one or more historical queries can include a corresponding entity name for the entity and a corresponding application name for the application.

In various implementations, the method can further include: determining fulfillment information for fulfilling a search of the entity within the application. In response to determining that the entity is associated with the application, the method can include: storing, at a user device, an association between the entity and the fulfillment information for fulfilling the search of the entity within the application. Subsequent to the storing, the method can include: receiving, via the user device, user input that indicates the entity but not the application; and in response to receiving the user input that indicates the entity but not the application, causing, based on the stored association between the entity and the fulfillment information, a suggestion to be rendered via the user device in a selectable format/manner. The suggestion can be in the selectable format that, when selected, executes the fulfillment information to fulfill the search (or another action) of the entity within the application.

In various implementations, the one or more historical queries include one or more queries submitted via the user device.

In various implementations, the method can further include: determining a count of the one or more historical queries that include the corresponding entity name and the corresponding application name; and determining that the count satisfies a privacy threshold. In some implementations, storing the association between the entity and the fulfillment information can be further in response to determining that the count satisfies the privacy threshold.

In various implementations, the one or more historical queries include at least one personal query submitted via the user device, and wherein storing the association between the entity and the fulfillment information is further in response to the at least one personal query having been submitted via the user device.

In various implementations, the fulfillment information includes a deeplink that, when executed, causes fulfillment of the search of the entity within the application. Alternatively or additionally, the fulfillment information includes a natural language intent, and one or more parameters for the intent, for fulfilling the search of the entity within the application. For instance, the natural language intent and the one or more parameters for the intent can be received by an automated assistant which causes the search of the entity to be performed within the application.

In various implementations, the association between the entity and the fulfillment information includes an association between one or more of the corresponding entity names, of the entity, and the fulfillment information. For instance, the entity (e.g., a movie) can correspond to different entity names (e.g., a movie name in English, a movie name in Korean, a name popular among audiences that refers to the movie, or a famous dialog or scene known from the movie, etc.). In these implementations, the user input can include any given entity name of the corresponding entity names of the entity.

In various implementations, determining that the entity is associated with the application comprises: processing, using a trained probabilistic model, the user input, to generate an output indicating a plurality of probabilities each representing a respective likelihood that the entity is present in one of a plurality of applications installed at the user device, and determining, based on the plurality of probabilities each representing the respective likelihood that the entity is present in one of a plurality of applications installed at the user device, that the entity is associated with the application.

In various implementations, another computer-implemented method is provided and includes: training a probabilistic model based one or more historical queries each including a respective entity name indicating a respective entity and a respective application name indicating a respective application; processing, using the trained probabilistic model, a name indicating an entity as input, to generate an output indicating at least one probability that indicates a likelihood that the entity is present in an application; and determining fulfillment information for fulfilling a search of the entity within the application. For example, as described previously in this disclosure, one or more entity files can be generated by processing the one or more historical queries using a Mapreduce system, where each of the plurality of entity files corresponds to an application. In other words, entities from the one or more historical queries can be processed and divided into different groups each being associated with a distinct application.

As a non-limiting example, a client device may be installed with (and assuming only within) a first application and a second application, and in response to determining that the client device is installed with the first application and the second application, an entity file for the first application can be downloaded and stored locally at the client device (if the first application is one of the applications that one or more of the historical queries mention), and an entity file for the second application can be downloaded and stored locally at the client device (if the second application is one of the applications that one or more of the historical queries mention). The entity file for the first application can include one or more public (or personal) entities present in the first application, a count of those public (or personal) entities present in the one or more historical queries, and/or one or more entity names for each of the one or more public (or personal) entities. Optionally or subsequently, the entity file for the first application can include, or be updated to include: fulfillment information associated with each of the one or more public) (or personal entities, where the fulfillment information for each pubic (or personal) entity enables one or more actions (search, display, etc.) with respect to the corresponding public (or personal) entity to be performed within the first application. Descriptions for the entity file for the second application are similar and thus repeated descriptions are not provided herein. The probabilistic model can be trained using the entity file for the first application and the entity file for the second application, to predict a first probability that a particular entity is accessible via the first application and/or a second probability that the particular entity is accessible via the second application. Based on the first and second probabilities, whether the entity is accessible via the first or second application can be determined.

In various implementations, in response to the likelihood satisfying a threshold, and in response to the application being installed at a computing device, the method can further include: storing, at the computing device, an association between the entity and the fulfillment information for fulfilling the search of the entity within the application. Subsequent to the storing, the method can include: receiving, via the computing device, user input that indicates the entity but not the application; and in response to receiving the user input that indicates the entity but not the application: generating a suggestion corresponding to the fulfillment information for fulfilling the search of the entity within the application, and causing the suggestion to be rendered via the computing device in a selectable format. The suggestion can be in the selectable format and when selected, executes the fulfillment information to fulfill the search of the entity within the application.

In various implementations, the one or more historical queries are associated with multiple users, and the entity is a public entity having occurred in more than a predefined number of historical queries from the one or more historical queries that are associated with the multiple users.

In various implementations, the one or more historical queries include at least one personal query specific to a user of the computing device, and wherein the entity is a personal entity only shown in the personal query specific to the user.

In various implementations, the fulfillment information includes a deeplink that, when executed, fulfills the search of the entity within the application. In various implementations, the fulfillment information includes a natural language intent, and one or more parameters for the intent, for fulfilling the search of the entity within the application.

In various implementations, the one or more historical queries include at least one personal query submitted via a particular device, and wherein storing the association between the entity and the fulfillment information is further in response to the at least one personal query having been submitted via the particular device.

In various implementations, a system is provided and includes at least one processor and memory storing instructions that, when executed, cause the at least one processor to: determine that an entity is associated with an application, based on identifying occurrence of one or more historical queries submitted via one or more corresponding computing devices, wherein each of the one or more historical queries include a corresponding entity name for the entity and a corresponding application name for the application; determine fulfillment information for fulfilling a search of the entity within the application; and in response to determining that the entity is associated with the application, store, at a user device, an association between the entity and the fulfillment information for fulfilling the search of the entity within the application. Subsequent to the storing, the at least one processor can be configured to receive, via the user device, user input that indicates the entity but not the application; and in response to receiving the user input that indicates the entity but not the application, cause, based on the stored association between the entity and the fulfillment information, a suggestion to be rendered via the user device in a selectable format. The suggestion in the selectable format, when selected, executes the fulfillment information to fulfill the search of the entity within the application.

In various implementations, the corresponding application name for the application is an application nickname, an application name synonym, or an application type name. However, the corresponding application name is not limited herein, and can be in any other appropriate format used to identify or characterize the corresponding application.

In various implementations, the at least one processor is further configured to determine a count of the one or more historical queries that include the corresponding entity name and the corresponding application name; and determine that the count satisfies a privacy threshold. The association between the entity and the fulfillment information can be stored further in response to determining that the count satisfies the privacy threshold.

In various implementations, the fulfillment information includes a deeplink that, when executed, causes fulfillment of the search of the entity within the application. Alternatively or additionally, the fulfillment information includes a natural language intent and one or more parameters for the intent, that causes an automated assistant to fulfill the search of the entity within the application.

In various implementations, the entity corresponds to one or more corresponding entity names, and wherein the association between the entity and the fulfillment information includes an association between one or more of the corresponding entity names, of the entity, and the fulfillment information.

What is claimed is:

1. A computer-implemented method, comprising:
determining that an entity is associated with an application, wherein determining that the entity is associated with the application is based on identifying occurrence of one or more historical queries submitted via one or more corresponding computing devices, that each include a corresponding entity name for the entity and a corresponding application name for the application;
determining fulfillment information for fulfilling a search of the entity within the application;
in response to determining that the entity is associated with the application:
storing, at a user device, an association between the entity and the fulfillment information for fulfilling the search of the entity within the application; and
subsequent to the storing:
receiving, via the user device, user input that indicates the entity but not the application, and
in response to receiving the user input that indicates the entity but not the application:
causing, at the user device, and based on the stored association at the user device, between the entity and the fulfillment information, a suggestion to be rendered via the user device in a selectable format, wherein the suggestion in the selectable format, when selected, executes the fulfillment information stored at the user device to fulfill the search of the entity within the application, and wherein the suggestion, when selected, executes the fulfillment information based on the stored association, at the user device, being between the entity and the fulfillment information.

2. The method of claim 1, wherein the one or more historical queries include one or more queries submitted via the user device.

3. The method of claim 1, further comprising:
determining a count of the one or more historical queries that include the corresponding entity name and the corresponding application name; and
determining that the count satisfies a privacy threshold;
wherein storing the association between the entity and the fulfillment information is further in response to determining that the count satisfies the privacy threshold.

4. The method of claim 1, wherein the one or more historical queries include at least one personal query submitted via the user device, and wherein storing the association between the entity and the fulfillment information is further in response to the at least one personal query having been submitted via the user device.

5. The method of claim 1, wherein the fulfillment information includes a deeplink that, when executed, causes fulfillment of the search of the entity within the application.

6. The method of claim 1, wherein the fulfillment information includes a natural language intent, and one or more parameters for the natural language intent, for fulfilling the search of the entity within the application.

7. The method of claim 1, wherein the association between the entity and the fulfillment information includes an association between one or more of the corresponding entity names, of the entity, and the fulfillment information.

8. The method of claim 1, wherein the user input includes a given one of the corresponding entity names of the entity.

9. The method of claim 1, wherein the corresponding application name for the application is an application nickname, an application name synonym, or an application type name.

10. A computer-implemented method, comprising:
training a probabilistic model using one or more historical queries each including a respective entity name indicating a respective entity and a respective application name indicating a respective application;
processing, using the trained probabilistic model, a name indicating an entity as an input, to generate an output indicating at least one probability that indicates a likelihood that the entity is present in an application;
determining fulfillment information for fulfilling a search of the entity within the application;
in response to the likelihood satisfying a threshold, and in response to the application being installed at a computing device:
storing, at the computing device, an association between the entity and the fulfillment information for fulfilling the search of the entity within the application; and
subsequent to the storing:
receiving, via the computing device, user input that indicates the entity but not the application, and
in response to receiving the user input that indicates the entity but not the application:
generating a suggestion corresponding to the fulfillment information for fulfilling the search of the entity within the application, and
causing, at the computing device, the suggestion to be rendered via the computing device in a selectable format, wherein the suggestion in the selectable format, when selected, executes the fulfillment information stored at the computing device to fulfill the search of the entity within the application, and wherein the suggestion, when selected, executes the fulfillment information based on the stored association, at the computing device, being between the entity and the fulfillment information.

11. The method of claim 10, wherein the one or more historical queries are associated with multiple users, and wherein the entity is a public entity having occurred in more than a predefined number of historical queries from the one or more historical queries that are associated with the multiple users.

12. The method of claim 10, wherein the one or more historical queries include at least one personal query specific to a user of the computing device, and wherein the entity is a personal entity only shown in the at least one personal query specific to the user.

13. The method of claim 10, wherein the fulfillment information includes a deeplink that, when executed, fulfills the search of the entity within the application.

14. The method of claim 10, wherein the fulfillment information includes a natural language intent, and one or more parameters for the natural language intent, for fulfilling the search of the entity within the application.

15. The method of claim 10, wherein the one or more historical queries include at least one personal query submitted via a particular device, and wherein storing the association between the entity and the fulfillment information is further in response to the at least one personal query having been submitted via the particular device.

16. The method of claim 10, wherein the respective application name indicating the respective application is an application nickname, an application name synonym, or an application type name, of the respective application.

17. A system comprising:
at least one processor; and
memory storing instructions that, when executed, cause the at least one processor to:
   determine that an entity is associated with an application, based on identifying occurrence of one or more historical queries submitted via one or more corresponding computing devices, wherein each of the one or more historical queries include a corresponding entity name for the entity and a corresponding application name for the application;
   determine fulfillment information for fulfilling a search of the entity within the application;
   in response to determining that the entity is associated with the application:

store, at a user device, an association between the entity and the fulfillment information for fulfilling the search of the entity within the application; and
subsequent to the storing:
   receive, via the user device, user input that indicates the entity but not the application, and
   in response to receiving the user input that indicates the entity but not the application:
      cause, at the user device, and based on the stored association between the entity and the fulfillment information, a suggestion to be rendered via the user device in a selectable format,
         wherein the suggestion in the selectable format, when selected, executes the fulfillment information stored at the user device to fulfill the search of the entity within the application, and wherein the suggestion, when selected, executes the fulfillment information based on the stored association, at the user device, being between the entity and the fulfillment information.

18. The system of claim 17, wherein the at least one processor is further configured to:
determine a count of the one or more historical queries that include the corresponding entity name and the corresponding application name; and
determine that the count satisfies a privacy threshold;
   wherein the association between the entity and the fulfillment information is stored further in response to determining that the count satisfies the privacy threshold.

19. The system of claim 17, wherein the fulfillment information includes a deeplink that, when executed, causes fulfillment of the search of the entity within the application.

20. The system of claim 17, wherein the fulfillment information includes a natural language intent and one or more parameters for the natural language intent, that cause an automated assistant to fulfill the search of the entity within the application.

21. The system of claim 17, wherein the entity corresponds to one or more corresponding entity names, and wherein the association between the entity and the fulfillment information includes an association between one or more of the corresponding entity names, of the entity, and the fulfillment information.

22. The system of claim 17, wherein the corresponding application name for the application is an application nickname, an application name synonym, or an application type name.

* * * * *